(12) United States Patent
Van Laack

(10) Patent No.: US 10,875,465 B2
(45) Date of Patent: Dec. 29, 2020

(54) BACK REST FOR A VEHICLE SEAT

(71) Applicant: FAURECIA AUTOSITZE GMBH, Stadthagen (DE)

(72) Inventor: Alexander Van Laack, Aachen (DE)

(73) Assignee: FAURECIA AUTOSITZE GMBH, Stadthagen (DE)

( * ) Notice: Subject to any disclaimer, the term of this patent is extended or adjusted under 35 U.S.C. 154(b) by 0 days.

(21) Appl. No.: 16/434,719

(22) Filed: Jun. 7, 2019

(65) Prior Publication Data

US 2019/0389396 A1 Dec. 26, 2019

(30) Foreign Application Priority Data

Jun. 26, 2018 (DE) .................. 10 2018 115 294

(51) Int. Cl.
| | | |
|---|---|---|
| *B60R 11/02* | (2006.01) | |
| *A47C 7/72* | (2006.01) | |
| *H04R 1/02* | (2006.01) | |
| *B60R 11/00* | (2006.01) | |

(52) U.S. Cl.
CPC .......... *B60R 11/0223* (2013.01); *A47C 7/727* (2018.08); *H04R 1/025* (2013.01); *B60R 2011/0015* (2013.01); *B60R 2011/0045* (2013.01); *H04R 2499/13* (2013.01)

(58) Field of Classification Search
CPC . B60R 11/0223; B60R 11/02; B60R 11/0217; B60R 2011/0015; B60R 2011/0045; A47C 7/727; H04R 1/025; H04R 2499/13
USPC ....................................... 297/217.5
See application file for complete search history.

(56) References Cited

U.S. PATENT DOCUMENTS

| | | | | |
|---|---|---|---|---|
| 6,377,695 B1* | 4/2002 | Azima | ................. | B60R 11/0217 381/152 |
| 7,092,531 B2* | 8/2006 | Enya | .................... | B60R 11/0217 340/435 |
| 7,561,706 B2* | 7/2009 | Holmi | ................. | B60R 11/0217 348/837 |
| 8,794,708 B2 | 8/2014 | Besnard | | |
| 9,800,983 B2* | 10/2017 | Wacquant | .............. | H04R 27/00 |
| 2006/0056650 A1* | 3/2006 | Hofmann | ............... | H04R 1/023 381/338 |
| 2008/0273723 A1* | 11/2008 | Hartung | .................... | H04S 7/30 381/302 |
| 2013/0049947 A1* | 2/2013 | Lanter | .................... | B60N 2/002 340/457.1 |
| 2016/0255430 A1* | 9/2016 | Fujita | ................... | H04R 1/2803 381/333 |

FOREIGN PATENT DOCUMENTS

| | | |
|---|---|---|
| DE | 19903393 A1 | 8/2000 |
| DE | 10303441 A1 | 9/2003 |
| EP | 1007390 B1 | 6/2000 |

* cited by examiner

*Primary Examiner* — Mark R Wendell
(74) *Attorney, Agent, or Firm* — Barnes & Thornburg LLP

(57) ABSTRACT

A back rest for a seat, in particular, vehicle seat, comprises a seat paneling and an acoustic element being an element contributing to forming the seat paneling. The seat paneling is in an operative connection with an actuator of the acoustic element in an acoustic area. The acoustic area can be made to vibrate by driving the actuator for making the acoustic area put out acoustic signals into a back space behind the back rest.

19 Claims, 3 Drawing Sheets ically has to be supplied, e.g., a piece of foam and a stable outer layer. This enables a particularly good vibration of the acoustic area because the acoustic area will have a sufficient stiffness so as to be able to be excited to vibrate in its entirety.

BACK REST FOR A VEHICLE SEAT

PRIORITY CLAIM

This application claims to German Application No. DE 10 2018 115 294.9, filed Jun. 26, 2018, which is expressly incorporated by reference herein.

BACKGROUND

The present disclosure relates to a seat, in particular, a back rest for a seat. More particularly, the present disclosure relates a back rest for a vehicle seat.

SUMMARY

According to the present disclosure, a back rest for a seat, in particular, vehicle seat, as well as a seat provides for desirable perception of acoustic signals by an occupant or, respectively, by an passenger in a simple and space-saving manner.

In illustrative embodiments, it is provided that in a back rest, which comprises a seat paneling and an acoustic element being an element contributing to forming the seat paneling, whereby the seat paneling is in an operative connection with an actuator of the acoustic element in an acoustic area and whereby the acoustic area can be made to vibrate by driving the actuator for making the acoustic area put out acoustic signals into a back space behind the back rest, with the acoustic area being delimited by a transition area in the seat paneling in such a way that the seat paneling is vibration-cushioned against the acoustic area in an outside area different from the acoustic area.

In illustrative embodiments, a clearly defined acoustic area in the seat paneling is provided, via which the acoustic element generates and puts out acoustic signals. Hereby, it is not the entire seat paneling that is vibrated but only a certain part thereof. Hereby, in particular, the attachment points of the seat paneling with the seat frame of the back rest do not have a negative effect on the generation of the acoustic signals (muffled sound) because the attachment points are located in the outside area which is vibration-cushioned against the acoustic area. Thus, this outside area does not or only minimally contributes to the output of the acoustic signals, and the vibrations in the acoustic area are not influenced by the attachment of the seat paneling to the seat frame. Further influence on the outside area which might compromise vibrated seat paneling can also be avoided because only the clearly delimited acoustic area contributes to the generation of sound. Thus, the sound of the acoustic element can be of high quality.

In illustrative embodiments, the seat paneling may be used as a resonating body or, respectively, membrane, it is possible to save space and weight because the already existing seat paneling then fulfills another function. The actuator may changed which, however, consumes only little space. The sound will be generated by the surface, designed to be accordingly large, of the seat paneling in the acoustic area. By virtue of using the seat paneling or, respectively, the back rest, the passenger or, respectively, occupant sitting behind it can be acoustically irradiated with music or speech from the front at high quality so that, for example, a surround sound cam be created in concert with further lateral or back loudspeakers. Owing to the large surface and the configuration of the acoustic element the acoustic signals can also be emitted at a very large angle of radiation so that the acoustic perception in the back space is essentially independent from the angle the back rest is adjusted to. Thus, no afterwards adjustment is required.

In illustrative embodiments, it is provided, that the transition area to completely surrounds the acoustic area. Hereby, a particularly good vibration dampening over the entire circumference can be attained. In principle, however, merely a partial arrangement of the transition area can be provided so as to, for example, simplify production.

In illustrative embodiments, it is provided that the transition area is designed such that the vibration of the seat paneling in the outside area is independent from the vibration induced by the actuator in the acoustic area. Thereby, full vibration dampening is achieved so that the outside area makes no contribution to the acoustic signals, making it possible to maximize the sound.

In illustrative embodiments, it is provided that the seat paneling within the acoustic area is, at least, identical, i.e. from the same material, with the seat paneling in the outside area.

In illustrative embodiment, it is provided that the transition area is created by at least one constriction, for example, a notch, in the seat paneling. This selectively introduces a weak point into the seat paneling via which the vibration induced in the acoustic area cannot propagate towards the outside area so that, hereby, a vibration dampening is attained. This vibration dampening can be produced very easily because the seat paneling is identical in the acoustic area and in the outside area and one must merely introduce a constriction into the material.

In illustrative embodiments, it may be provided that the seat paneling comprises a reinforcement in the outside area so that the acoustic area, starting at the transition area, exhibits a different degree of rigidity compared to the outside area. This, too dampens a vibration of the acoustic area starting at the transition area because the vibration cannot propagate as strongly in the reinforced or, respectively, more rigid area. Hereby, the constriction and the reinforcement can also be combined. It may be provided that an additional reinforcement layer is applied onto the outside area. Thus, the material of the outside area will be, at least in certain areas, identical with the material of the acoustic area, simplifying production because, in certain areas, only an additional reinforcement layer must be applied while no general change has to be made with respect to the material in the outside area of the seat paneling.

In illustrative embodiments, it is provided that the actuator is in operative connection with the seat paneling in the acoustic area via a transmission element, said transmission element being glued onto the seat paneling or embedded into the seat paneling. Thus, the actuator generates a vibration by means of, for example, an alternating magnetic field, and this vibration is transmitted via the transmission element to the seat paneling. In order to create a secure and lasting transition, in the simplest case, a glued connection can be established. Depending on the material, however, an embedded connection is also possible so as to optimize the transmission of vibration.

In illustrative embodiments, it may be provided that the seat paneling is made in a CCT process (Cover Carving Technology) or manufactured from a thermoplastic plastics material. Hereby, a particularly flexible seat paneling is created in that, initially, a support unit made of foam is created in the shape of the seat paneling on which, subsequently, a cover element is attached. The cover element is created by cold formation of a foam sprayed onto a stretched substrate made of polypropylene and applied to the back side of a textile material or a synthetic fabric. In one example, during the cold formation, pressure is applied so that the foam exhibits a viscose state.

In illustrative embodiments, the CCT process provides a very flexible and robust seat paneling that can be created into which, moreover, in die something can be embedded in a simple and reliable manner. In the event that a gluing connection is provided, the seat paneling can be produced in a CCT process or from a thermoplastic plastics material, for example, polypropylene.

In illustrative embodiments, it is provided that the actuator is configured to be electrically controlled as a function of a transmission signal. Hereby, a flexible generation of the acoustic signals at high quality can be attained which may contain, for example, music or speech. In addition hereto or alternatively, however, it may be provided that the transmission signal is generated as a function of pricked-up environmental noises in such a way that the environmental noises in the back space can be minimized by driving the actuator with the transmission signal and the generation of acoustic signals by the acoustic area as a function thereof. Thus, environmental noises are reduced by destructive interference (noise cancellation).

In illustrative embodiments, a seat is provided comprising a seating portion and a back rest, as described before, which are connected in a fixed relation or pivoting. Hereby, the seat can be used in any vehicle, for example, motor vehicle, commercial vehicle, bus, aircraft or train, to put out the acoustic signals at high quality and good sound in a back space where an occupant or, respectively, a passenger is situated.

In illustrative embodiments, instead of the seat paneling, any other panel in the interior cabin of the respective vehicle can be provided with the acoustic element, for example, in the region of a steering wheel, a central console, a dashboard, a side panel, a hat rack, etc. To that end, by means of corresponding constructive measures, as described above, an acoustic area is created which can be vibrated via the actuator so as to generate acoustic signals.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
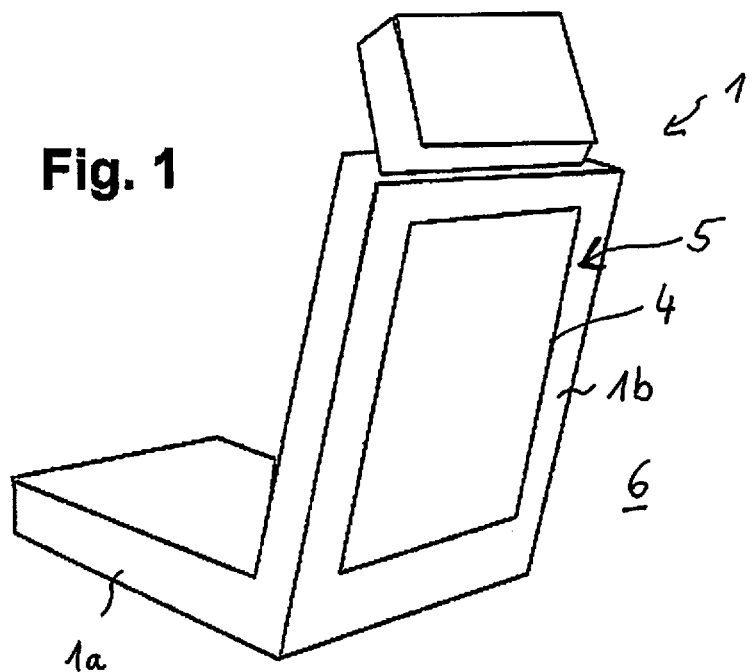
FIG. 1 is a schematic view of a seat.
Figure 2A:
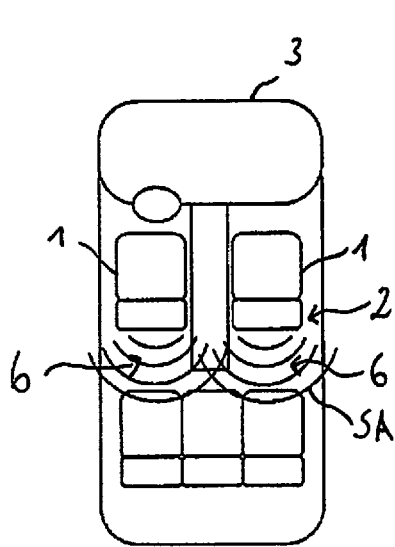
FIGS. 2a, 2b show arrangements of the seat according to FIG. 1 in an interior cabin of a vehicle.
Figure 2B:
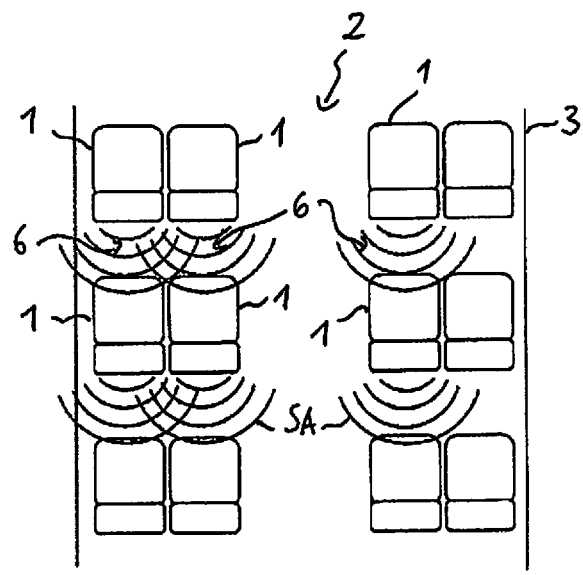

According to FIG. 1, a seat 1, in particular, a vehicle seat, is provided, comprising a seating portion 1a and a back rest 1b pivoting mounted thereon. In accordance with the present disclosure, a vehicle seat may be a seat 1 used in in any vehicle 3 for transporting occupants or, respectively, passengers. Thus, it could be, for example, a seat 1 in a motor vehicle or, respectively, in a commercial vehicle, in a bus, in a train, in an aircraft or in further vehicles serving for transporting persons. As can be seen in FIGS. 2a and 2b, such a seat 1 can be positioned in an interior cabin 2 of the respective vehicle 3 in any type of arrangement. Hereby, FIG. 2a shows, by way of example, a motor vehicle and FIG. 2b a bus, a Zug or an aircraft having several rows of seats 1.

According to FIG. 1, the back rest 1b of the seat 1 comprises an acoustic element 5 partially integrated in the back rest 1b. The acoustic element 5 can be used to emit sound into a back space 6 in the respective vehicle 3 behind the seat 1. In order to attain this the acoustic element 5 is configured to emit acoustic signals SA. Hereby, the acoustic signals SA emitted by the acoustic element 5 are put out at a wide radiating area into the back space 6, indicated in FIG. 2a, 2b by the circular segment shaped wave fronts.

Figure 3:
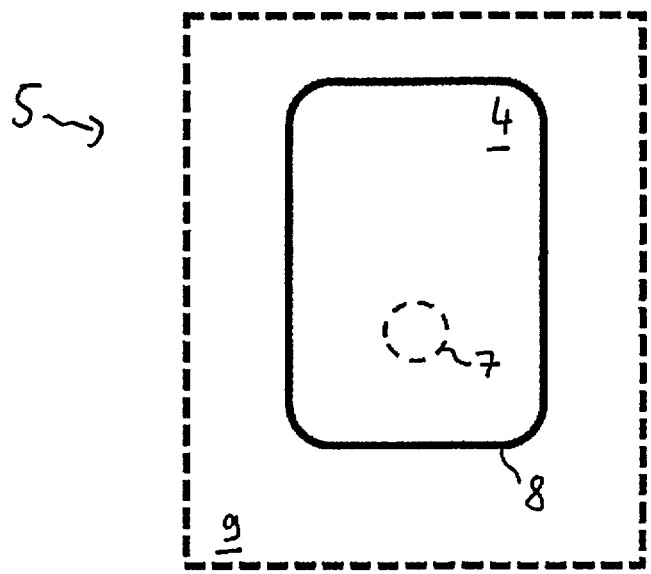
FIG. 3 is a section of a back rest of the seat according to FIG. 1.

To make this possible, the acoustic element 5 is provided as shown schematically in FIG. 3. Thus, an actuator 7 is provided which is in an operative connection with an acoustic area 4, whereby the acoustic area 4 is delimited from an outside area 9 by a transition area 8. The operative connection between the actuator 7 and the acoustic area 4 is provided as shown in the FIGS. 4a and 4b. Thus, a transmission element 10 is arranged between the actuator 7 and the acoustic area 4 which element can serve to transmit a movement of the actuator 7 to the acoustic area 4.

The actuator 7 is designed such that it is vibrated as a function of a control via an electric transmission signal SU, whereby the vibrations are also transmitted to the transmission element 10 connected to the actuator 7 and, therewith, also to the acoustic area 4. Hereby, the actuator 7 can be designed, for example, as a magnetic actuator 7 generating, as a function of the control by the transmission signal SU, alternating magnetic fields which set the actuator 7 and, thereby, the transmission element 10 in a forwards and backwards motion at the respective frequency.

Hereby, the actuator 7 causes the transmission element 10 and also the acoustic area 4 to vibrate at a certain frequency. Hereby, the transmitted data are generated as a function of the information to be reproduced by the acoustic element 5 which may include, for example, music or speech. This sets the transmission element 10 or, respectively, the acoustic area 4 in vibrations such that acoustic signals SA for acoustic reproduction of the information are generated. Thus, the acoustic area 4 acts as a type of a membrane causing the surrounding air to vibrate.

Hereby, a seat paneling 11 of the back rest 1b serves directly as membrane or, respectively, acoustic area 4 which paneling either directly represents the surface of the back rest 1b or is disposed below a protective cover 12, for example, a fabric cover, of the back rest 1b. Hereby, the actuator 7 is preferably disposed inside the back rest 1b thereby being not visible.

Figure 4A:
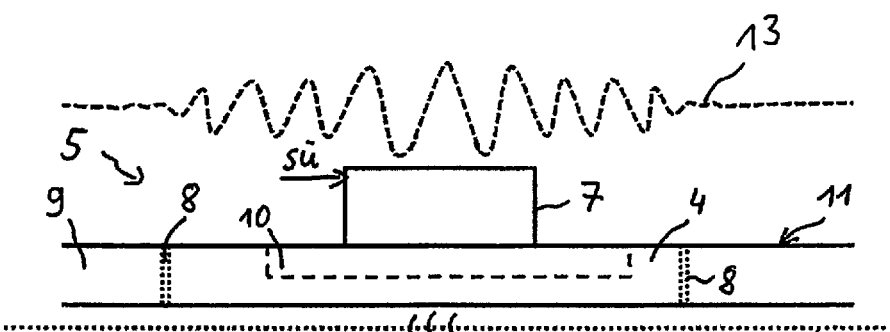
FIGS. 4a, 4b show sectional views through a region of the back rest according to FIG. 3.
Figure 4B:
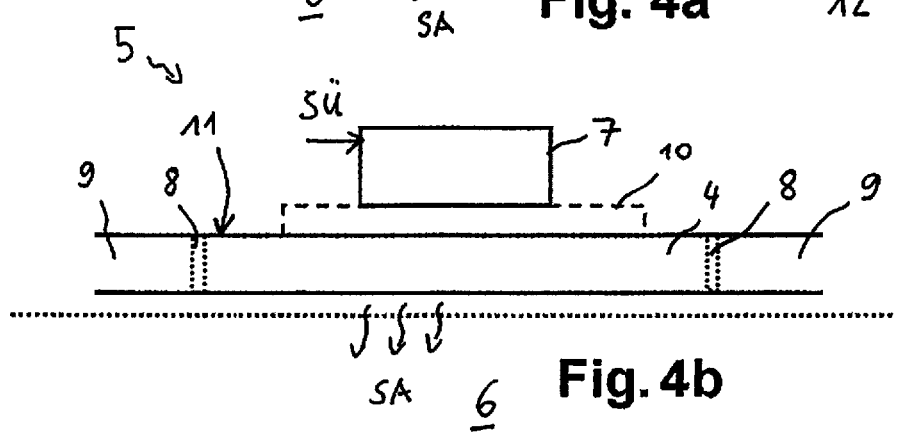

In order to provide a suitable transmission of the vibrations generated by the actuator 7 to the seat paneling 11 the transmission element 10 may be embedded, as shown in FIG. 4a, directly into the seat paneling 11 allowing for an efficient transmission of the vibrations. For that purpose, a transmission element 10 is to be selected which corresponds in general to the material of the seat paneling 11. Then, the seat paneling 11 can be made, for example, in a CCT process (Cover Carving Technology). Hereby, a particularly flexible seat paneling 11 is created in that, firstly, a support unit made of foam is created in the shape of the seat paneling 11 to which subsequently a cover element is attached. The cover element is created by cold formation of a foam sprayed onto a stretched substrate made of polypropylene and applied to the back side of a textile material or a synthetic fabric.

Hereby, during the cold formation, pressure is applied so that the foam exhibits a viscose state. Reference is hereby made to U.S. Pat. No. 8,794,708 for disclosure relating to a process in which during cold formation, pressure is applied so that the foam exhibits a viscose state, which application is hereby incorporated in its entirety herein. Embedding the transmission element 10 into the seat paneling 11 in such a manner allows the cost of assembly or, respectively, manufacturing to be minimized.

In another example, the transmission element 10 may also be attached to the seat paneling 11 by means of a glued connection, e.g. by an adhesive or an adhesive tape. Then, the seat paneling 11, too, may be produced by the above-described CCT process or even from any other material, for example, polypropylene.

Thus, in both embodiments, the vibration generated by the actuator 7 can be transmitted to the seat paneling 11 thereby causing the seat paneling 11 to vibrate so as to also cause the surrounding air to vibrate and to generate corresponding acoustic signals SA in the back space 6. In order to allow for an efficient generation of vibrations of the seat paneling 11 the seat paneling may be attached to the seat frame via individual flexible fixation points. This minimizes dampening at the edge of the seat paneling 11 improving the overall sound.

By utilizing the seat paneling 11 of the back rest 1b as part of the acoustic element 5 it is possible to have no additional loudspeakers in the seat 1 thereby allowing the seat paneling 11 to fulfill an additional function. This increases the weight of the seat 1 only marginally because merely an actuator 7 is required which, however, can be arranged on der seat paneling 11 with the corresponding transmission element 10 in a space-saving manger and with little weight.

By arranging the acoustic element 5 in the back rest 1b des seat 1 it is possible for a passenger or, respectively, occupant sitting behind it to perceive the acoustic signals SA even also the front so that, for example, a surround sound can be achieved. Utilization of the seat paneling 11 allows for a very large radiation area of the acoustic signals SA so that the acoustic signals SA will reach the occupants or, respectively, passengers in the back space 6 still in good quality and high intensity even in the event that the inclination of the back rest 1b is adjusted.

In order to increase the quality of the acoustic signals SA it is provided that the acoustic area 4 is clearly delimited against the rest of the seat paneling 11 in an outside area 9 by means of a transition area 8. This allows the seat paneling 11 to be vibrated only in the acoustic area 4 while in the outside area 9, which is separated from the acoustic area 4 by the transition area 8, essentially no or, respectively, a strongly attenuated vibration of the seat paneling 11 will be present. This is illustrated by an example in FIG. 4a by means of the vibration distribution 13. According to this, the amplitude of the vibrations outside of the transition area 8, i.e. in the outside area 9, essentially drops to zero.

Hereby, it can be avoided that the acoustic signals SA are influenced, e.g. by the attachment of the seat paneling 11 to the seat frame of the seat 1 thereby distorting the sound. Rather, the transition area 8 creates a more or less sharp transition preventing the outside area 9 of the seat paneling 11 from significantly compromising the vibrations in the central region of the seat paneling 11 or, respectively, in the acoustic area 4.

Figure 5A:
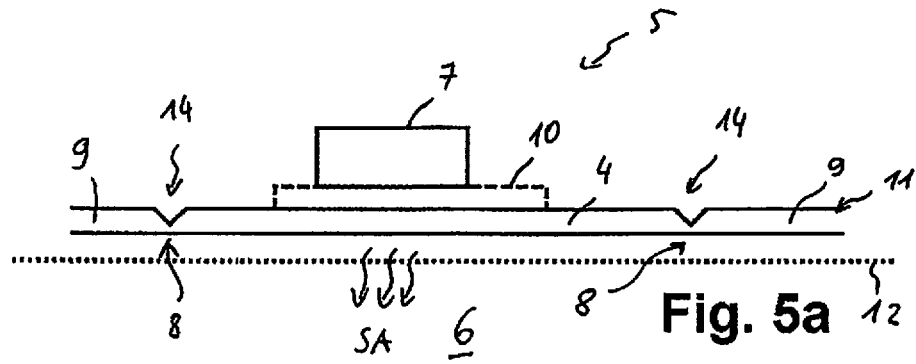
FIGS. 5a-5d show various embodiments of an acoustic element in the back rest.
Figure 5B:
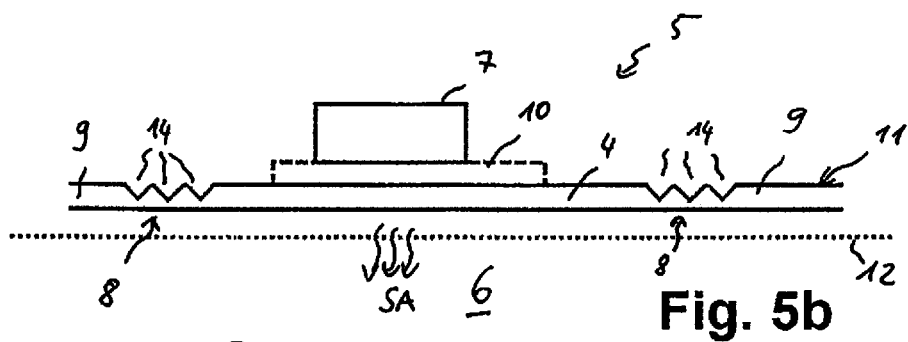

The FIG. 5a through d show exemplary options of how to design the transition area 8. According to this, in FIG. 5a, it is provided for the seat paneling 11 to be weakened in the transition area 8 by means of a constriction 14, for example, a notch, to thereby create a transition from the acoustic area 4 to the outside area 9. Thereby, vibration generated by the actuator 7 in the acoustic area 4 of the seat paneling 11 are not fully transmitted to the outside area 9, and the vibrations of the seat paneling 11 are markedly attenuated in the outside area 9 so that the outside area 9 does not or only to a very limited extent contribute to the generation of the acoustic signals SA. In FIG. 5a, by way of example only, a notch is shown as constriction 14. However, other shapes are also possible that weaken the seat paneling 11 in the transition area 8. According to FIG. 5b, it may also be provided that a multiplicity of constrictions 14 are introduced in order to intensify the attenuation of the vibrations of the seat paneling 11 in the outside area 9. Hereby, preferably, the material of the outside area 9 and the acoustic areas 4 is identical so as to simply production of the seat paneling 11.

Figure 5C:
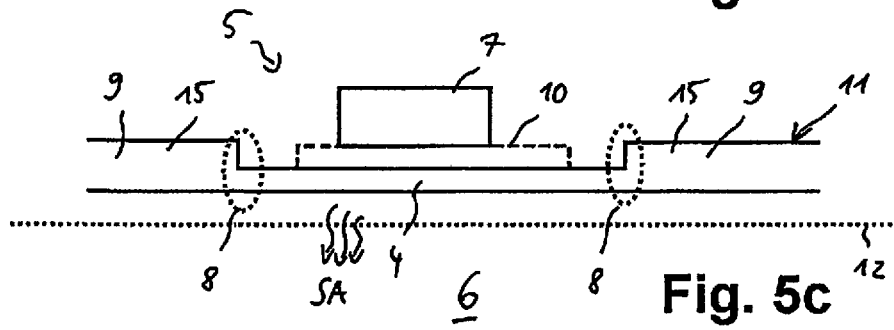

According to the embodiment in FIG. 5c, it may further be provided for the seat paneling 11 to be provided thicker and/or with higher rigidity in the outside area 9 beginning at the transition area 8, i.e. the seat paneling 11 being provided with a reinforcement 15 on the surface and/or integrally so that vibrations of the seat paneling 11 generated in the acoustic area 4 have only a strongly attenuated effect in the outside area 9. This, too, results in the acoustic signals SA being mainly generated in the acoustic area 4 and emitted into the back space 6.

Figure 5D:
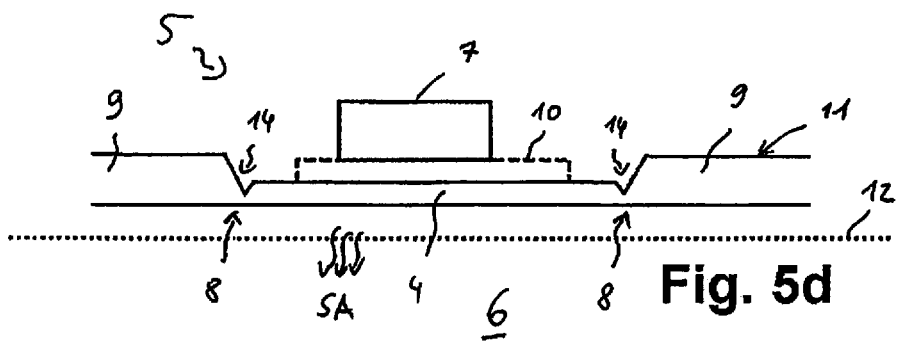

According to the embodiment of FIG. 5d, the variants mentioned above can also be combined, i.e. in the outside area 9 the seat paneling 11 being provided with a reinforcement 15 and, in addition, constructions 14 of the seat paneling 11 for weakening the seat paneling 11 being introduced into the transition area 8 so as top combined the advantages of both options and guarantee sufficient attenuation of the vibrations of the seat paneling 11 in the outside area 9.

Thus, in all embodiments of the FIGS. 5a through 5d, it can be achieved that acoustic signals SA are generated in the back space 6 by a vibration of the acoustic area 4 induced by the actuator 7 and the vibration of the seat paneling 11 in the outside area 9 is attenuated. Thus, the outside area 9 does not or, respectively, only to a largely reduced extent, contributed to the generation of the acoustic signals SA. Therefore, the quality of the emitted acoustic signals S can be improved.

In addition to the reproduction of music and speech, the transmission signals SÜ or, respectively, the data can be generated as a function of achieving an attenuation of environmental noise in the interior cabin 6. To that end, environmental noise is first picked up and processed and oscillations or, respectively, vibrations are induced by the actuator 7 in the seat paneling 11 in the acoustic area 4 which minimize the picked-up environmental noise by reducing amplitude of the environmental noise by means of destructive interference which may be referred to as noise cancellation.

LIST OF REFERENCE NUMERALS 1 seat
1a seating portion
1b back rest
2 interior cabin
3 vehicle
4 acoustic area
5 acoustic element
6 back space
7 actuator
8 transition area 9 outside area
10 transmission element
11 seat paneling
12 protective cover
13 vibration distribution
14 constriction
15 reinforcement Acoustic elements, for example, loudspeakers, may be arranged in vehicles, in particular, motor vehicles, aircraft, rail vehicles, busses or other vehicles used for passenger transport, in such a way that passengers or, respectively, occupants can perceive acoustic signals in an interior cabin of the vehicle. Hereby, occupants or, respectively, passengers are able, for example, to listen to music, take phone calls or be supplied with information. To that end, the acoustic elements, for example, loudspeakers, are arranged inside the vehicle, for example, laterally inside a panel of the vehicle door or similar and/or in the roof lining or in aircraft and busses even above the respective passenger or, respectively, occupant on the luggage storage. When such loudspeakers are used, the passenger is unable to directly perceive sound from the front from a central position.

In order to directly perceive sound from the front from a central position, the acoustic element or, respectively, the loudspeaker can be integrated into a seat of the respective vehicle, for example, into the back rest, and directed towards the occupant or, respectively, passenger positioned behind this. However, there is usually little space in vehicle seats and, therefore, only a loudspeaker having a small space requirement can be integrated into the seat leading to a reduced quality of the acoustic signals. Also, an integrated loudspeaker significantly increases the weight of the vehicle seat. Loudspeakers also exhibit a certain angle of radiation which is not configured in such a way that the acoustic signals will still be directed towards the occupant or, respectively, passenger positioned behind it even in the event that the vehicle seat is adjusted, in particular, the angle of inclination of the backrest is adjusted. In this example, therefore, the loudspeaker must be readjusted so that the acoustic signals can still be perceived at equal quality.

The present disclosure relates to a back rest for a seat, in particular, vehicle seat, comprising a seat paneling (11) and an acoustic element (5) being an element contributing to forming the seat paneling (11), whereby the seat paneling (11) is in an operative connection with an actuator (7) of the acoustic element (5) in an acoustic area (4), whereby the acoustic area (4) can be made to vibrate by driving the actuator (7) for making the acoustic area (4) put out acoustic signals (SA) into a back space (6) behind the back rest.

According to the present disclosure it is provided that the acoustic area (4) is delimited by a transition area (8) in the seat paneling (11) in such a way that the seat paneling (11) is vibration-cushioned against the acoustic area (4) in an outside area (9) different from the acoustic area (4).

The invention claimed is:

1. A back rest for a seat, the back rest comprising
a seat paneling and
an acoustic element being an element contributing to forming the seat paneling, said seat paneling being in an operative connection with an actuator of the acoustic element in an acoustic area, said acoustic area being made to vibrate by driving the actuator for making the acoustic area put out acoustic signals into a back space behind the back rest,
wherein the acoustic area is delimited by a transition area in the seat paneling in such a way that the seat paneling is vibration-cushioned against the acoustic area in an outside area different from the acoustic area,
wherein the actuator is in operative connection with the seat paneling in the acoustic area via a transmission element, the transmission element being embedded into the seat paneling.

2. The back rest of claim 1, wherein the transition area completely surrounds the acoustic area.

3. The back rest of claim 2, wherein the transition area is designed such that the vibration of the seat paneling in the outside area is independent from the vibration induced by the actuator in the acoustic area.

4. The back rest of claim 3, wherein the transition area is created by at least one constriction in the seat paneling.

5. The back rest of claim 4, wherein the seat paneling comprises a reinforcement in the outside area so that the acoustic area, starting at the transition area, exhibits a different degree of rigidity compared to the outside area, for vibration dampening the outside area against the acoustic area.

6. The back rest of claim 5, wherein the seat paneling is made in a CCT process or manufactured from a thermoplastic plastics material.

7. The back rest of claim 6, wherein the actuator is configured to be electrically controlled as a function of a transmission signal.

8. The back rest of claim 7, wherein the transmission signal transmits music signals or speech signals for acoustic output of music or speech by the acoustic signals put out by the acoustic area.

9. The back rest of claim 7, wherein the transmission signal is generated as a function of picked-up environmental noises in such a way that the environmental noises in the back space can be minimized by driving the actuator with the transmission signal and the generation of acoustic signals by the acoustic area as a function thereof.

10. A seat comprising a seating portion and the back rest of claim 1.

11. A back rest for a seat, the back rest comprising
a seat paneling and
an acoustic element being an element contributing to forming the seat paneling, said seat paneling being in an operative connection with an actuator of the acoustic element in an acoustic area, said acoustic area being made to vibrate by driving the actuator for making the acoustic area put out acoustic signals into a back space behind the back rest,
wherein the acoustic area is delimited by a transition area in the seat paneling in such a way that the seat paneling is vibration-cushioned against the acoustic area in an outside area different from the acoustic area,
wherein the acoustic area and the outside are made from the same material, a thickness of the acoustic area is the same as a thickness of the outside area, and the transition area is created by at least one constriction that extends into the seat paneling.

12. The back rest of claim 11, wherein the transition area completely surrounds the acoustic area.

13. The back rest of claim 12, wherein the transition area is designed such that the vibration of the seat paneling in the outside area is independent from the vibration induced by the actuator in the acoustic area.

14. The back rest of claim 13, wherein the seat paneling is made in a CCT process or manufactured from a thermoplastic plastics material.

15. The back rest of claim 11, wherein the actuator is configured to be electrically controlled as a function of a transmission signal, and the transmission signal is generated as a function of picked-up environmental noises in such a way that the environmental noises in a back space can be minimized by driving the actuator with the transmission signal and the generation of acoustic signals by the acoustic area as a function thereof.

16. A back rest for a seat, the back rest comprising
a seat paneling and
an acoustic element being an element contributing to forming the seat paneling, said seat paneling being in an operative connection with an actuator of the acoustic element in an acoustic area, said acoustic area being made to vibrate by driving the actuator for making the acoustic area put out acoustic signals into a back space behind the back rest,
wherein the acoustic area is delimited by a transition area in the seat paneling in such a way that the seat paneling is vibration-cushioned against the acoustic area in an outside area different from the acoustic area,
wherein the transition area is created by at least two constrictions or notches.

17. The back rest of claim 16, wherein the acoustic area and the outside area are made from the same material.

18. The back rest of claim 16, wherein the thickness of the acoustic area is the same as the thickness of the outside area.

19. The back rest of claim 16, wherein the at least two constrictions are arranged to extend into the seat paneling.

* * * * *